No. 643,223. Patented Feb. 13, 1900.
C. DHÉ & L. HOUZE.
PROCESS OF MAKING CONCAVO-CONVEX GLASS PLATES.
(Application filed Apr. 17, 1899.)
(No Model.)
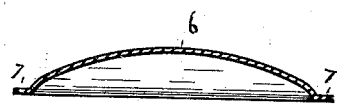
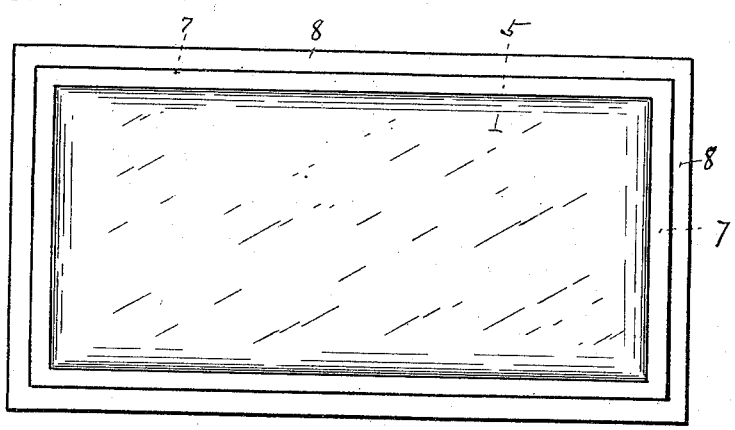
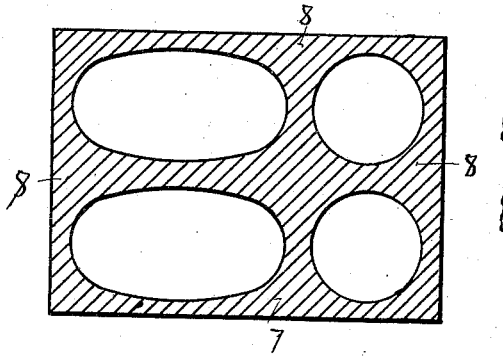 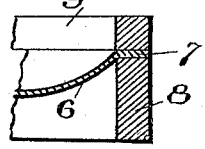
WITNESSES:
Charles Dhé
Luc Houze
INVENTORS
BY
H. C. Hartman
ATTORNEY.

UNITED STATES PATENT OFFICE.

CHARLES DHÉ AND LUC HOUZE, OF HARTFORD CITY, INDIANA.

PROCESS OF MAKING CONCAVO-CONVEX GLASS PLATES.

SPECIFICATION forming part of Letters Patent No. 643,223, dated February 13, 1900.

Application filed April 17, 1899. Serial No. 713,240. (No specimens.)

*To all whom it may concern:*

Be it known that we, CHARLES DHÉ and LUC HOUZE, citizens of the United States, residing at Hartford City, in the county of Blackford and State of Indiana, have invented a certain new and useful Process for Making Concavo-Convex Glass Plates, of which the following is a specification.

In the drawings, Figure 1 is a cross-section through the middle of the sheet. Fig. 2 is a cross-section through the middle of the sheet at right angles to the section shown at Fig. 1. Fig. 3 is a top view of a rectangular supporting-frame with a sheet of glass resting on it in place. Fig. 4 is a top view of a supporting-frame adapted for the formation of two oval concave surfaces and two circular concave surfaces on one sheet of glass. Fig. 5 is a detail view showing a portion of the supporting-frame in section.

Similar numerals of reference refer to similar parts throughout the several views.

A sheet of glass 5 is formed into one or more concavo-convex surfaces 6, with a flat surface or margin 7 surrounding said surfaces, the curved portions commencing at all points of such margin. The areas of such concavo-convex surfaces may be oval, circular, rectangular, or other desired form.

The process is as follows: We take a sheet of plate-glass or a plane sheet of glass—such as is furnished by glass-makers for windows, picture-frames, and like purposes—and we place it upon a supporting-frame 8, preferably of iron. The supporting-surfaces of this supporting-frame are adapted to correspond with the form of margins desired. In Figs. 1, 2, and 3 it is a rectangular form, the margin intended to be about one and one-quarter inches wide. The sheet of glass is placed upon this frame and it is then placed in a furnace. As soon as the glass begins to become soft its edges will curl up more or less; but upon being further heated they will fall flat again upon the marginal support of the frame. At this moment we place on top of the frame weights 9 to hold the margin or margins 7 in such a position. For this purpose we prefer a weighting-frame of exactly the same size as the supporting-frame and of suitable weight, which is let down on the sheet of glass covering the marginal surfaces. The weights or weighting-frame being subjected to the same heat from the beginning of the process, the application of the heat is then continued until the glass becomes so soft that it begins to fall within the margin or margins, forming concavo-convex surfaces of given areas by its own weight, a rectangular frame being shown by the cross-sections in Figs. 1 and 2. As soon as the convexed or concaved glass has reached the limit of curvature desired we move the frames, with their sheet of glass, into a cooling compartment, thereby arresting further descent of the glass and fixing it in the form desired. Such limit may be ascertained by the inspection of the operator, or a mold may be placed under the sheet which will regulate the same and likewise adjust the form of the curvature, if desired. The glass is then annealed as commonly done in window-glass manufacture. As soon as the glass hardens so as to keep its shape the weights or weighting-frame are removed to prevent any fracture. It is obvious that by the use of a frame of proper construction and weights or weighting-frame holding the flat or marginal portions of the sheet in proper position we can form concavo-convex portions of different shapes in area than the one illustrated in Figs. 1, 2, and 3, and such shapes may be oval, circular, or other form in area, and may be on different portions of one sheet. By this means a great variety of such concavo-convex surfaces can be formed and on a single sheet of glass. We have illustrated in Fig. 4 a frame for forming two oval and two circular parts on one sheet, whereby such convex surfaces will be formed as stated. This process of reheating the glass and forming these surfaces will give the treated glass a luster additional to that it formerly had and strengthen the glass, and it is also obvious that if the convex surface is opposed to the direction from which injuries or blows or pressure shall come such glass when secured in a holding-frame will be much stronger than a plane sheet of glass of the same thickness.

Having thus described our invention, we claim—

The process of forming concavo-convex glass plates, which consists in first supporting a glass plate around the margins of the desired formation, subjecting the same to heat, thereby softening the glass and causing the same to curl up at the marginal edges of the formation, continuing the heat, thereby causing the said edges to become again flat, then holding the said marginal edges in position by heated pressure thereon, continuing the heat, until the glass within the margin falls to the desired curvature, then cooling the same so supported, thereby arresting further descent of the glass, and fixing it in the form desired.

In witness whereof we have hereto set our hands, in the presence of two witnesses, this 12th day of April, 1899.

CHARLES DHÉ.
LUC HOUZE.

Witnesses:
S. B. FLEMING,
HENRY SPALDING.